United States Patent
Krisher

(10) Patent No.: US 6,662,684 B1
(45) Date of Patent: Dec. 16, 2003

(54) SINGLE-PIECE TRANSFER CASE HOUSING ASSEMBLY

(75) Inventor: James A. Krisher, Fort Wanye, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 5 days.

(21) Appl. No.: 09/620,976

(22) Filed: Jul. 20, 2000

(51) Int. Cl.[7] .................... F62J 13/04; F16H 57/02
(52) U.S. Cl. .................... 74/606 R; 474/144; 74/607
(58) Field of Search .................... 180/249, 197, 180/247, 250; 192/69.9, 85 C, 85 V, 85 R, 3.58; 74/606 R, 607, 665 GR, 497; 474/144–146

(56) References Cited

U.S. PATENT DOCUMENTS

| | | | |
|---|---|---|---|
| 4,779,698 A | | 10/1988 | Iwata |
| 4,787,267 A | | 11/1988 | Kessler et al. |
| 5,094,098 A | * | 3/1992 | Hori et al. .................... 74/497 |
| 5,353,890 A | * | 10/1994 | Clohessy .................... 180/247 |
| 5,655,983 A | | 8/1997 | Dick |
| 5,676,229 A | * | 10/1997 | Bates .................... 192/85 R |
| 5,704,863 A | * | 1/1998 | Zalewski et al. .................... 180/247 |
| 5,704,868 A | | 1/1998 | Lindsey et al. |
| 5,853,342 A | | 12/1998 | Pritchard et al. |
| 5,885,182 A | | 3/1999 | Forsyth |
| 5,916,052 A | * | 6/1999 | Dick .................... 180/248 |
| 5,957,806 A | * | 9/1999 | Hirose et al. .................... 192/3.58 |
| 5,967,930 A | * | 10/1999 | Ahluwalia .................... 74/606 R |
| 6,053,072 A | * | 4/2000 | Schleuder .................... 74/606 R |
| 6,161,643 A | * | 12/2000 | Bober et al. .................... 180/197 |
| 6,234,289 B1 | * | 5/2001 | Baker et al. .................... 192/85 V |

FOREIGN PATENT DOCUMENTS

JP    71010260 A  *  4/1995

* cited by examiner

Primary Examiner—Marcus Charles
(74) Attorney, Agent, or Firm—Liniak, Berenato & White

(57) ABSTRACT

A transfer case housing includes a single-piece casing forming an interior compartment provided with an access opening for assembling components of the transfer case, and a casing cover member for closing the access opening. The casing is manufactured as a single-piece casting wherein bearing bores could be machined into the unitary single-piece casing. The interior compartment is adapted to house an appropriate torque transfer mechanism, such as constant four-wheel-drive, or "on-demand" four-wheel-drive, providing rear or front wheel drive (two-wheel-drive mode), or four wheel drive (four-wheel-drive mode), controlled automatically or manually by a vehicle operator.

4 Claims, 4 Drawing Sheets

SINGLE-PIECE TRANSFER CASE HOUSING ASSEMBLY

BACKGROUND OF THE INVENTION

1. Field of the Invention

The present invention relates to transfer case assemblies, and more particularly to a transfer case housing made of a single-piece casting.

2. Description of the Prior Art

Transfer cases for four-wheel drive vehicles are well known in the prior art, and serve to transmit torque from an engine or prime mover to a plurality of drive axles to thereby drive front and rear axles of a motor vehicle. Typically, the transfer case comprises an input shaft driven by a vehicle transmission, two output shafts driving front and rear axles and a torque transfer mechanism including, but not limited to, driving and driven sprockets, a clutch device and an endless chain element transmitting input torque to the output shaft driving front wheels in a four-wheel drive mode. In case of a full-time four-wheel drive system, the transfer case does not comprise the clutch device. The transfer case is usually mounted behind and is driven by a transmission. Two shafts normally run from the transfer case: one to the front drive axle and one to the rear drive axle.

Conventionally, the torque transmitting chain is housed in a common compartment defined by a transfer case housing or casing. The casing is typically provided with a lubricating oil bath where the chain is partially immersed. The transfer case casing usually includes a number of pieces made by casting. Currently, the most common is a two-piece casing forming a so-called "clam-shell" type of housing. Each half of the clam-shell casing is cast and machined separately, then bolted together. A gasket is inserted between each half of the casing to prevent leakage of lubricating oil therefrom.

Inherent to this practice is a slight misalignment of bearing bores due to tolerance accumulation in the separate machining processes. Also, over the time, the gasket wears out and the lubricating oil tends to leak between the halves of the clam-shell casing. Furthermore, additional costs are associated with the use of two castings, machining steps, the sealing gasket and assembly operation required.

SUMMARY OF THE INVENTION

The present invention provides an improved housing assembly for transfer cases of four-wheel drive vehicles.

The housing assembly of the present invention comprises a single-piece casing provided with an access opening for assembling components of the transfer case, and a casing cover member for closing the access opening. The novel transfer case casing of the present invention is manufactured as a single-piece casting wherein bearing bores could be machined into the unitary single-piece casing. Thus, the manufacturing process includes only one casting, instead of two, eliminates the subsequent processes of machining of two halves of the prior art casings and fastening them together, and does not require additional sealing gasket. Moreover, the use of the single-piece casing eliminates the bore misalignment problem and any additional misalignment created by bolting of the two halves of the housing together. Also, the single-piece casing design, by eliminating the clam-shell joint, drastically reduces the undesired oil leakage issues. Furthermore, the single-piece casing improves housing stiffness, transfer case durability and noise, in addition to utilizing fewer parts and requiring less labor in assembly.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
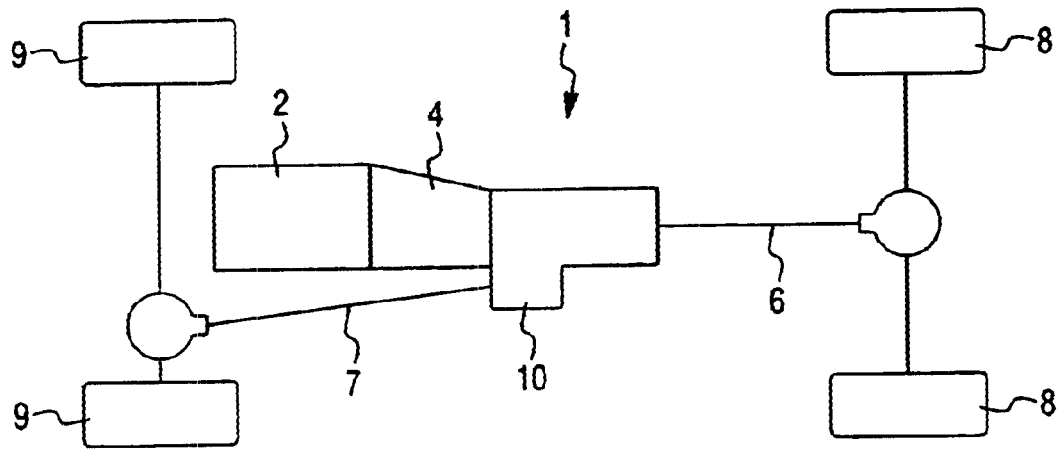
FIG. 1 is a schematic diagram showing a drivetrain of a four-wheel-drive vehicle.
Figure 5:
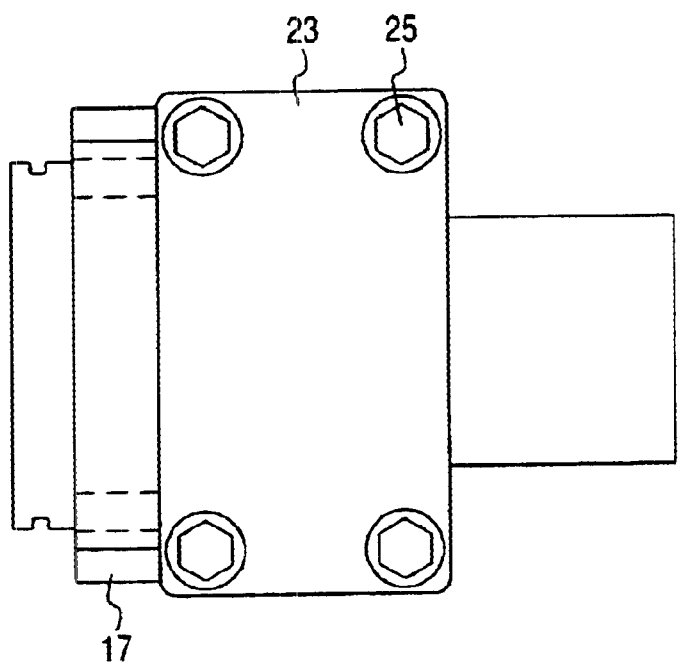
FIG. 5 is a side view of the transfer case in accordance with the first embodiment of the present invention.

Referring now to FIG. 1, a transfer case in accordance with the present invention is utilized in a four-wheel-drive (FWD) vehicle 1. The vehicle 1 comprises an engine 2, a multi-speed change gear mechanism 4, and-a four-wheel-drive transfer case 10. The transfer case 10 is coupled to the multi-speed change gear mechanism 4, which, in turn, is coupled to the engine 2. The transfer case 10 is connected to a rear propeller shaft 6 for driving rear wheels 8 of the vehicle 1, and to a front propeller shaft 7 for driving front wheels 9 of the vehicle 1.

The FIGS. 2, 3, 4 and 5 illustrate various views of-the transfer case 10 of the four-wheel-drive vehicle in accordance with a first preferred embodiment of the present invention. Such transfer cases offer permanent four-wheel-drive.

Reference numeral 12 defines a housing assembly of the transfer case 10, including a single-piece casing 14 having an outer wall 15 forming an interior compartment 16 provided with an access opening 18, and a cover member 23 adapted for closing the access opening 18. Part of the housing 14 surrounding the access opening 18 is provided with a continuous mounting flange 20. The cover member 23 is secured to the mounting flange 20, preferably by means of fasteners, such as bolts 25. It will be appreciated that any other means known in the prior art, to secure the cover member 23 to the casing 14 is also within the scope of the present invention. The interior compartment 16 is adapted to house a torque transfer mechanism 30 providing the permanent four-wheel-drive mode. Furthermore, the casing 14 is provided with an integral flange 17 secured to the multi-speed change gear mechanism 4 by any appropriate fasteners, such as bolts (not shown).

In the first exemplary embodiment of the present invention, the torque transfer mechanism 30 is a single speed torque transfer mechanism comprising an input shaft 32 drivingly connected to an output shaft (not shown) of the multi-speed change gear mechanism 4 at one end and to the rear propeller shaft 6 at the other end thereof, an output shaft 34 drivingly connected to the front propeller shaft 7, and a chain mechanism 36 adapted to transfer drive torque from the input shaft 32 to the output shaft 34.

The input shaft 32 is rotatably mounted in the wall 15 of the casing 14 by bearing assemblies 33 and 33', and extends through first axially aligned apertures (or openings) 22 and 22' formed in the wall 15 of the casing 14. The output shaft 34 is rotatably mounted in the wall 15 of the casing 14 by bearing assemblies 35 and 35'. One end of the output shaft 34 extends through a second aperture 24 formed in the wall 15 of the casing 14, the other (inboard) end is mounted within a bore 26 formed in the wall 15 of the casing 14, and axially aligned with the second aperture 24.

The chain mechanism 36 is provided to transfer drive torque from the input shaft 32 to the output shaft 34. The chain mechanism 36 comprises a first transmission wheel or drive sprocket 38, a second transmission wheel or driven sprocket 40, and an endless chain element 42, interconnecting the drive and driven sprockets 38 and 40, respectively. The drive sprocket 38 is drivingly secured to the input shaft 32, preferably, by spline connection. The driven sprocket 40 is secured about the output shaft 34, preferably, by spline connection.

Figure 6:
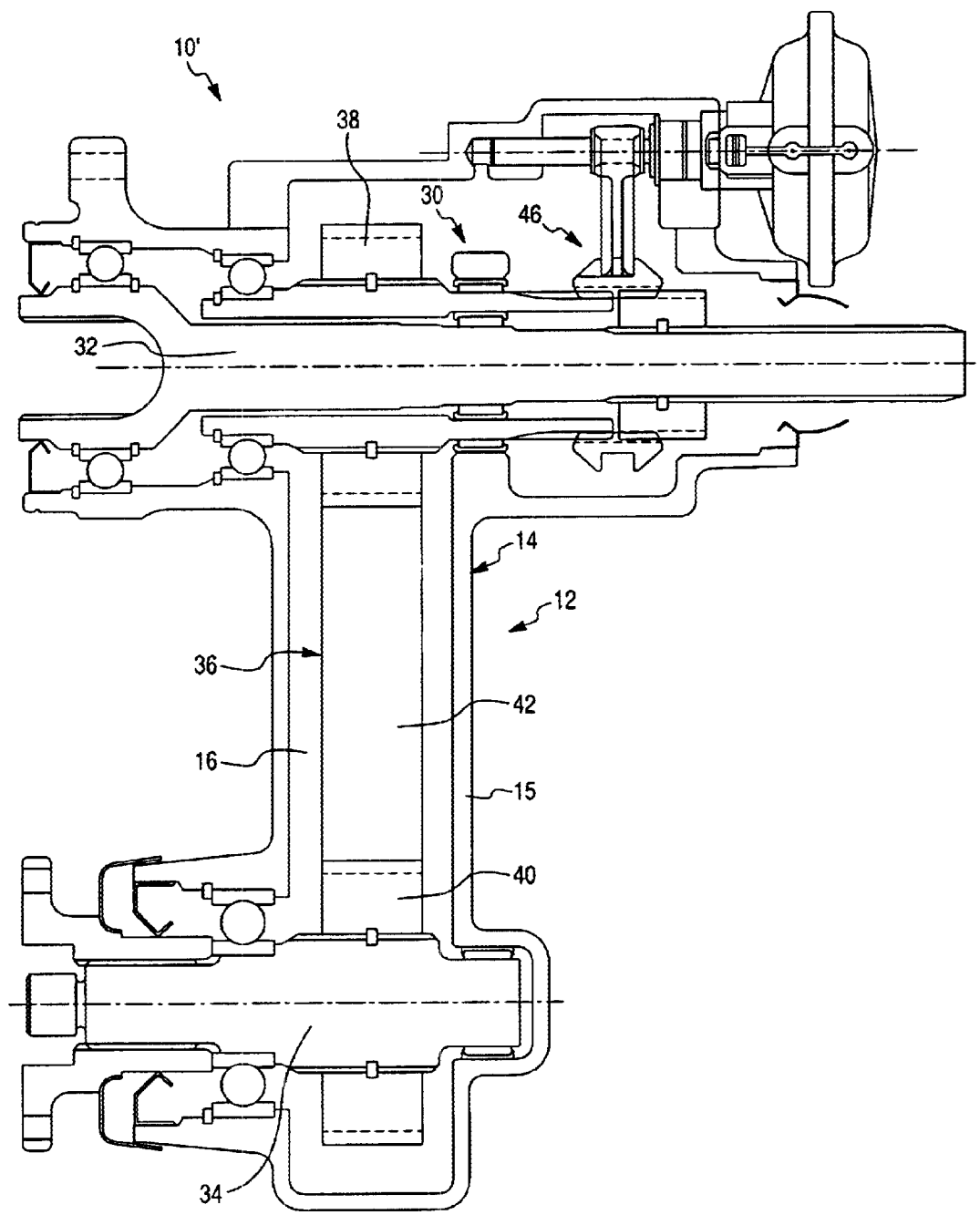
FIG. 6 is a top sectional view of a transfer case in accordance with the second embodiment of the present invention.

The transfer case of the present invention is not limited to the constant four-wheel drive arrangement. FIG. 6 illustrate a top sectional view of a transfer case 10' in accordance with the second embodiment of the present invention. Such transfer cases usually offer "on-demand" four-wheel-drive, providing rear or front wheel drive (two-wheel-drive mode), or four wheel drive-(four-wheel-drive mode), controlled automatically or manually by a vehicle operator. In FIG. 6, parts corresponding to those of FIGS. 1–5 have been designated by the same reference numeral.

Reference numeral 12 defines a housing assembly of the transfer case 10', including a single-piece casing 14 having an outer wall 15 forming an interior compartment 16 provided with an access opening (not shown), and a cover member (not shown) secured to the casing 14 and adapted for closing the access opening. The interior compartment 16 is adapted to house a torque transfer mechanism 30 adapted to selectively provide two-wheel-drive or four-wheel-drive mode.

In the second exemplary embodiment of the present invention illustrated in FIG. 6, the torque transfer mechanism 30 is a single speed torque transfer mechanism comprising an input shaft 32 drivingly connected to an output shaft (not shown) of the multi-speed change gear mechanism 4 at one end and to the rear propeller shaft 6 at the other end thereof, an output shaft 34 drivingly connected to the front propeller shaft 7, a chain mechanism 36, and a clutch assembly 46 adapted to selectively engage and disengage the output shaft 34 and, thus, defines a two-wheel-drive (2WD)—four-wheel-drive (4WD) control mechanism for selecting an engine torque distribution between the front and rear wheels. The particular structure of the transfer case 10' illustrated in FIG. 6, is provided with a pneumatically actuated positive engagement clutch. It will be appreciated that any other appropriate types of the clutch, such as friction clutch, and the clutch actuator, such as hydraulic, electromagnetic, electromechanical, are within the scope of the present invention.

It will be appreciated that any other arrangements of the torque transfer mechanism accommodated within the interior compartment of the single-piece casing 14 of the present invention, are within the scope of the present invention.

Another aspect of the present invention is a method for assembling the transfer case of the present invention. It will be described in particular reference to FIGS. 1–5 illustrating the transfer case 10 in accordance with the first exemplary embodiment of the present invention.

Figure 2:
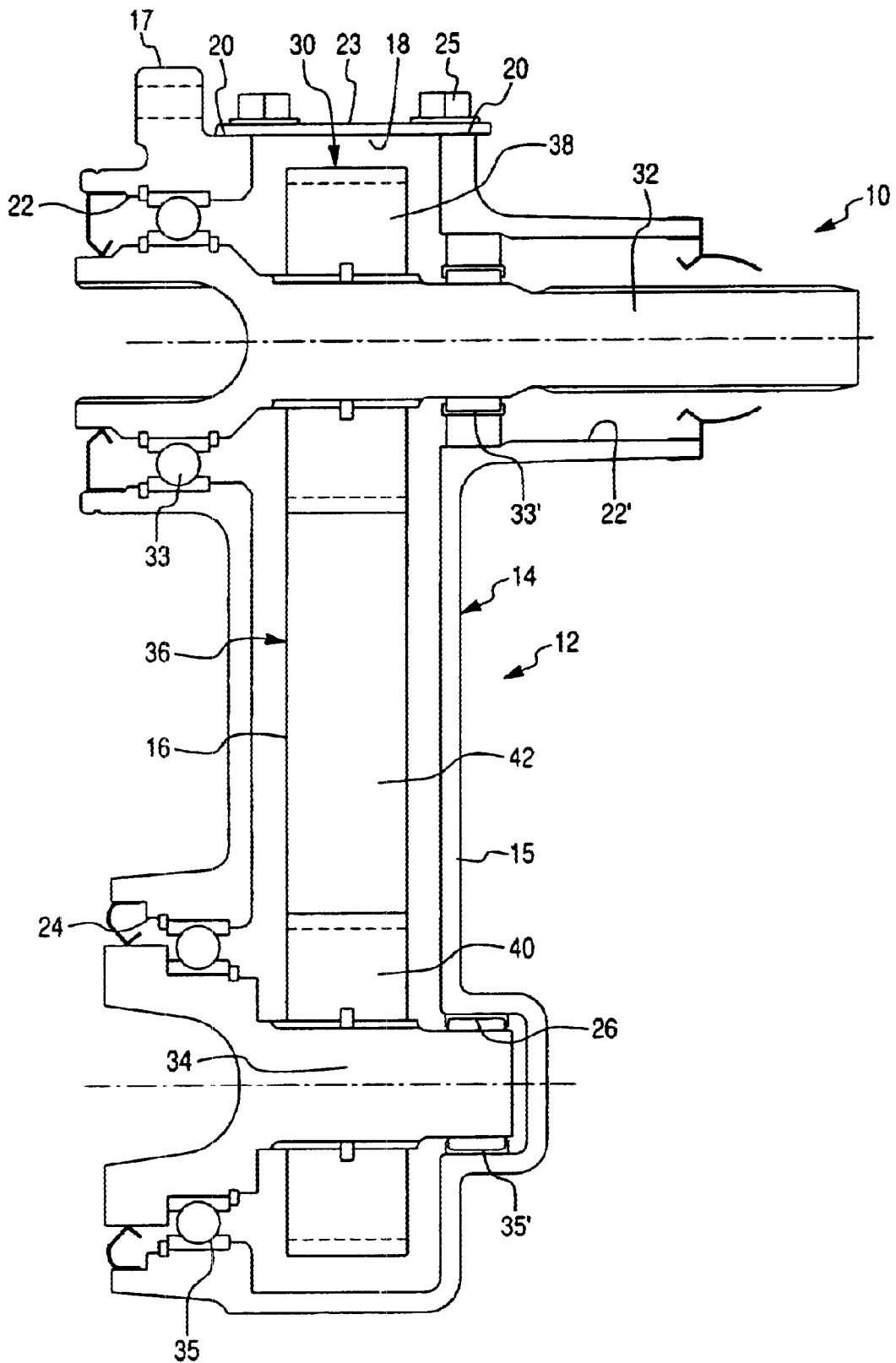
FIG. 2 is a top sectional view of a transfer case in accordance with the first embodiment of the present invention.
Figure 3:
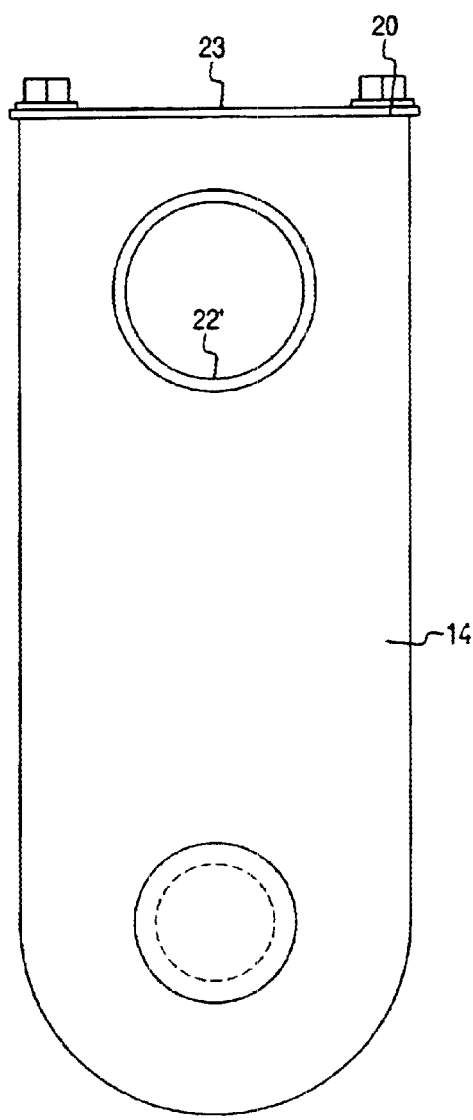
FIG. 3 is a rear view of the transfer case in accordance with the first embodiment of the present invention.
Figure 4:
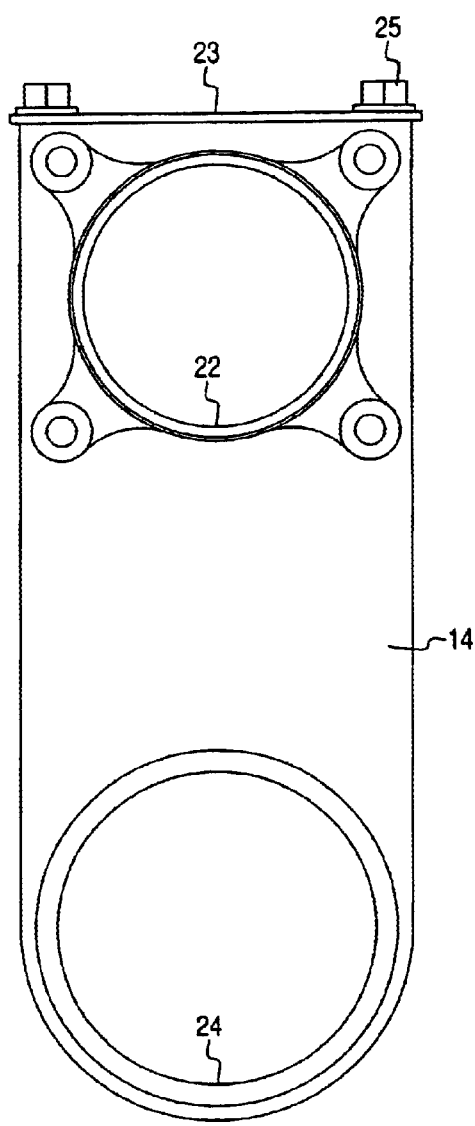
FIG. 4 is a front view of the transfer case in accordance with the first embodiment of, the present invention.

The first step of this method is to install the chain 42, and the drive and driven sprockets 38 and 40, respectively, into the interior compartment 16 of the single-piece casing 14 through the access opening 18. Next, the output shaft 34 is installed into the casing 14 by inserting it into the second opening 24. The output shaft 34 is continued to move rightward through the driven sprocket 40 until it reaches the bore 26 and is mounted therein, as shown in FIG. 2. Then, the input shaft 32 is inserted into the first opening 22 and transported toward the first opening 22' through the drive sprocket 38 until the input shaft 32 extends trough the first opening 22' and is appropriately positioned within the interior compartment 16 of the casing 14. Subsequently, the input shaft 32 is secured within the casing 14 by any appropriate means well known in the art, such as snap rings. Finally, the cover member 23 is fastened to the mounting flange 20 of the casing 14.

The method for assembly of the transfer case 10' in accordance with the second exemplary embodiment of the present invention is similar to the above described method, and, therefore, will not be disclosed in detail.

Therefore, the transfer' case casing of the present invention is manufactured as a single-piece casting wherein bearing bores could be machined into the unitary single-piece casing. Thus, the manufacturing process requires only one casting, eliminates the subsequent processes of machining of two halves of the prior art casings and fastening them together, and does not require additional sealing gasket. Moreover, the use of the single-piece casing eliminates the bore misalignment problem and any additional misalignment created by bolting of the two halves of the housing together. Also, the single-piece casing design, by eliminating the clam-shell joint, drastically reduces the undesired oil leakage issues. Furthermore, the single-piece casing improves housing stiffness, transfer case durability and noise, in addition to utilizing fewer parts and requiring less labor in assembly.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A transfer case for a four-wheel drive vehicle, comprising:
   a torque transfer mechanism;
   a single-piece casing having a continuous sidewall and a bottom wall integrally formed with said sidewall, said single piece casing defining an interior compartment containing said torque transfer mechanism of said transfer case and an access opening disposed opposite said bottom wall and provided with a continuous mounting flange; and a cover member secured to said mounting flange of said single-piece casing;

said torque transfer mechanism including:

a first shaft rotatably mounted within said single-piece casing;

a first sprocket drivingly secured about said first shaft;

a second shaft rotatably mounted within said casing and spaced from said first shaft;

a second sprocket drivingly secured about said second shaft; and an endless chain element transmitting torque from said first sprocket to said second sprocket;

said single-piece casing further including:

a pair of axially aligned first shaft openings formed on opposite sides of said sidewall of said single-piece casing and provided to receive anti-friction bearings to rotatably support said first shaft;

a second shaft opening formed on said sidewall of said single-piece casing; and a bore formed on said sidewall of said single-piece casing and axially aligned with said second shaft opening and formed opposite thereof, wherein said second shaft opening and said bore being provided to receive anti-friction bearings to rotatably support said second shaft.

2. The transfer case for a four-wheel drive vehicle as defined in claim 1, wherein said torque transfer mechanism further including a clutch assembly comprising:

a clutch device adapted to selectively connect said first shaft to said second shaft, and a clutch actuator.

3. The transfer case for a four-wheel drive vehicle as defined in claim 3, wherein said clutch device is a positive engagement clutch.

4. The transfer case for a four-wheel drive vehicle as defined in claim 2, wherein said clutch actuator is a pneumatic actuator.

* * * * *